United States Patent [19]

Hood

[11] 3,980,222

[45] Sept. 14, 1976

[54] LONGITUDINALLY PARTITIONED TUBULAR BODY

[75] Inventor: Charles R. Hood, Cincinnati, Ohio

[73] Assignee: The Procter & Gamble Company, Cincinnati, Ohio

[22] Filed: June 11, 1975

[21] Appl. No.: 586,103

Related U.S. Application Data

[63] Continuation of Ser. No. 415,467, Nov. 13, 1973, abandoned.

[52] U.S. Cl. .................................. 229/22; 229/56; 222/94; 220/20
[51] Int. Cl.² ..................... B65D 5/06; B65D 31/12
[58] Field of Search ................... 229/22, 15, 4.5; 220/20; 222/107 X, 94 X, 92; 206/484

[56] References Cited
UNITED STATES PATENTS

| | | | |
|---|---|---|---|
| 1,459,257 | 6/1923 | Reger | 220/20 |
| 2,401,110 | 5/1946 | Rohdin | 229/56 |
| 3,224,640 | 12/1965 | Schneider et al. | 222/94 X |
| 3,381,818 | 5/1968 | Cope et al. | 206/84 |
| 3,506,157 | 4/1970 | Dukess | 222/94 |
| 3,601,252 | 8/1971 | Sager | 222/107 UX |

FOREIGN PATENTS OR APPLICATIONS 437,209  10/1935  United Kingdom

Primary Examiner—Davis T. Moorhead
Attorney, Agent, or Firm—Thomas J. Slone; John V. Gorman; Richard C. Witte

[57] ABSTRACT

A longitudinally partitioned tubular body made from a single sheet of material. The sheet of material is looped, spindled and seamed to integrally form a chordal partition and a tubular exterior wall. The tubular exterior wall comprises two circumferentially overlapped longitudinally extending seams. The two seams are oppositely disposed adjacent the two oppositely disposed longitudinally extending side edges of the chordal partition. The chordal partition divides the space within the tubular exterior wall into two longitudinally extendingg tubular spaces disposed in back-to-back relation. A pair of oppositely disposed edges of the sheet of material extend longitudinally of the body. One such tubular body embodiment has one such longitudinally extending edge of the sheet disposed inside one of the tubular spaces and the other of the longitudinally extending sheet edges of the sheet disposed outside the exterior wall of the body. An alternate tubular body embodiment is provided in which both such longitudinally extending edges of the sheet are disposed outside the exterior wall of the body.

3 Claims, 24 Drawing Figures

U.S. Patent  Sept. 14, 1976  Sheet 1 of 3  3,980,222
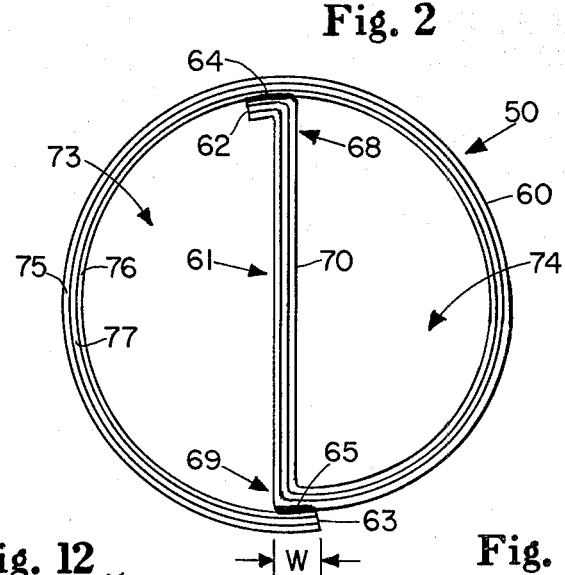
Fig. 2
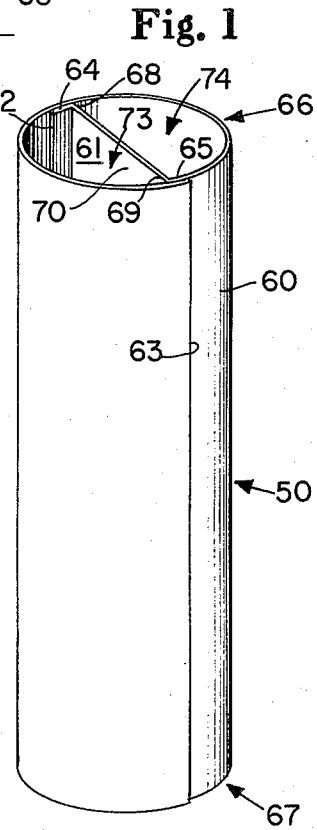
Fig. 1
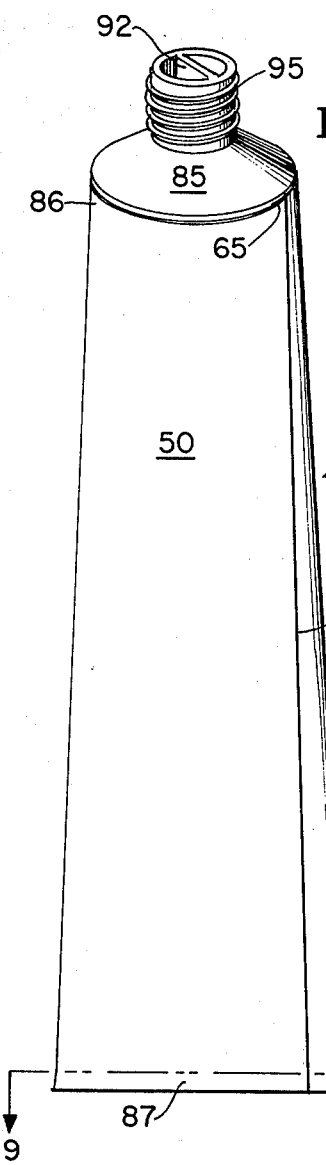
Fig. 8
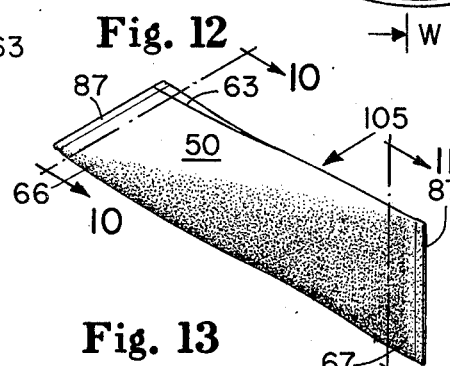
Fig. 12
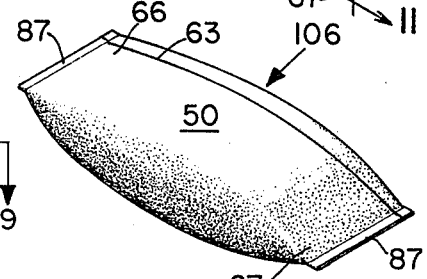
Fig. 13
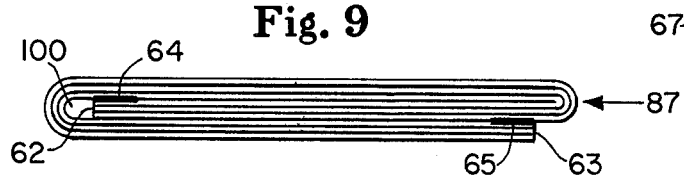
Fig. 9
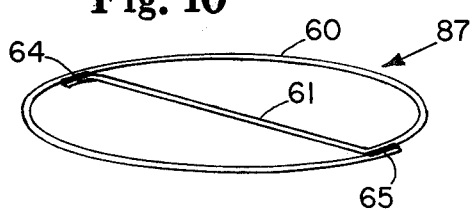
Fig. 10
Fig. 11

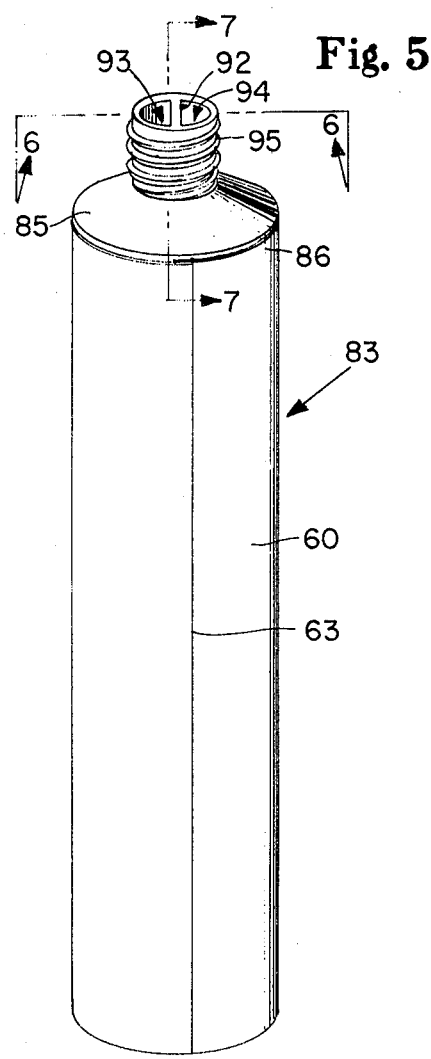
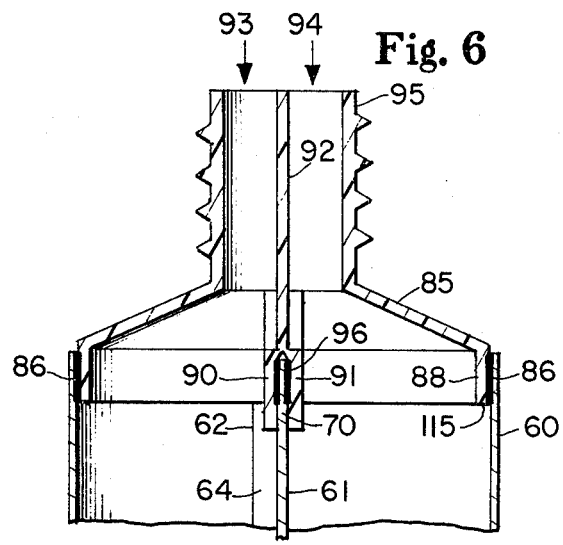
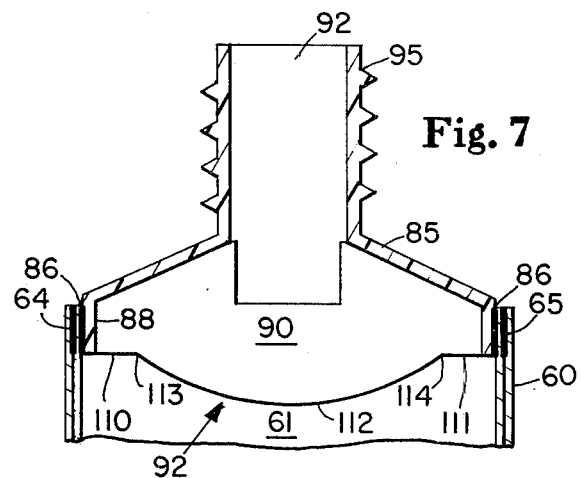
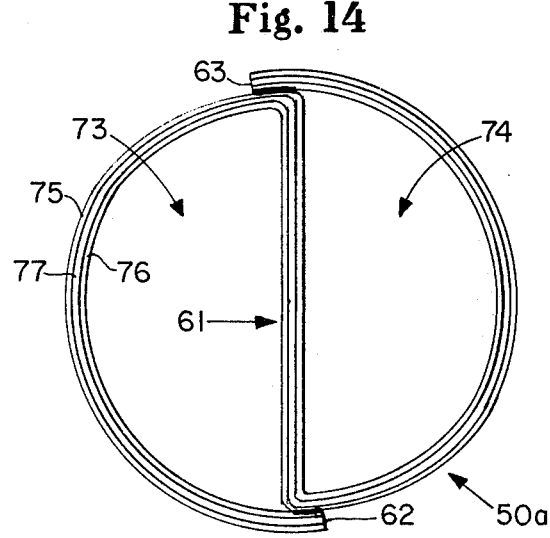
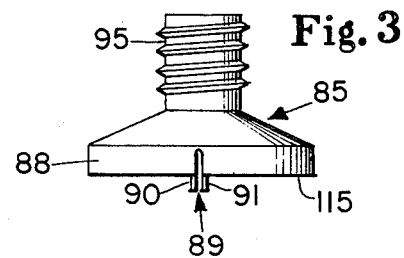
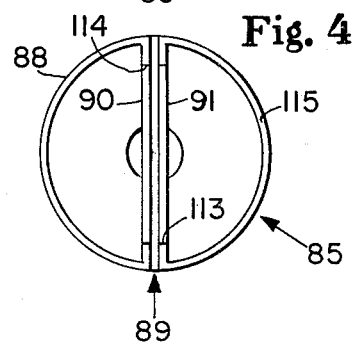

LONGITUDINALLY PARTITIONED TUBULAR BODY

This is a continuation, of application Ser. No. 415,467, filed Nov. 13, 1973, now abandoned.

CROSS REFERENCES TO RELATED APPLICATIONS

This application is related to the commonly assigned concurrently filed application of Charles R. Hood and Stephen F. Evans entitled COLLAPSIBLE LONGITUDINALLY PARTITIONED TUBULAR DISPENSING CONTAINER filed Nov. 13, 1973, Ser. No. 415,468, which discloses and claims container configurations comprising tubular body embodiments of the present invention. This application is also related to the commonly assigned concurrently filed application of Stephen F. Evans entitled METHOD OF AND APPARATUS FOR MAKING LONGITUDINALLY PARTITIONED TUBULAR BODIES AND CONTAINER ASSEMBLIES filed Nov. 13, 1973, Ser. No. 415,483, which discloses and claims a method of and apparatus for making tubular body embodiments of the present invention.

FIELD OF THE INVENTION

This invention relates to providing longitudinally partitioned tubular bodies which may be sealed at both ends to form packages having two compartments or which bodies may be sealingly secured to suitably divided head fitments to provide collapsible longitudinally partitioned tubular dispensing containers for two component products such as epoxy adhesives, and toothpastes.

BACKGROUND OF THE INVENTION

Products consisting of two flowable components such as pastes, gels, or liquids which must be stored separately are desirably packaged in containers having two compartments. Tubular bodies having chordal partitions are useful in providing two-compartment containers for two-component products which must have predetermined proportions of their components mixed at the time or point of use.

A number of longitudinally partitioned tubular bodies and dispensing containers having chordal partitions have been disclosed in the art. For instance, French Pat. No. 961,154, published May 8, 1950, titled "Improvement in Tubes for Ointments or the Like" comprises a headed, tubular dispensing container having a Z-shape longitudinally extending partition fitted into it before being filled. German Pat. No. 580,134, filed July 17, 1931 discloses a collapsible longitudinally partitioned tubular dispensing container wherein the tubular body portion is formed from a tube which has its diameter reduced to provide wall portions which are formed into two diametrically opposed, longitudinally extending channels. A substantially planar partition is then fitted into the channels whereby it becomes a diametral partition. After such fitting, the partition is sealed in the channels as by crimping and the channel portions are bent so that they extend circumferentially with respect to the wall of the tube. U.S. Pat. No. 3,290,422, issued Dec. 6, 1966 to Kenneth George Michel, discloses a method of producing a dispensing container by injection molding a head fitment and a longitudinally extending partition onto and inside of, respectively, a tubular body. Tubular containers having asymmetrically disposed chordal partitions are disclosed in U.S. Pat. No. 3,506,157 issued Apr. 14, 1970 to Joseph Dukess. Tubular bodies formed from sheet material are also disclosed in the prior art in, for example, U.S. Pat. No. 3,307,738 issued Mar. 7, 1967 to Christian Theodore Scheindel. None of the referenced prior art has, however, solved all of the problems associated with providing longitudinally partitioned tubular bodies in the manner of nor to the degree of the present invention.

SUMMARY OF THE PRESENT INVENTION

The nature and substance of the instant invention will be more readily appreciated after giving consideration to its major aims and purposes. The principal objects of the invention are recited in the ensuing paragraphs in order to provide a better appreciation of its important aspects prior to describing the details of a preferred embodiment and other embodiments in later portions of this description.

A major object of the invention is providing a tubular body which is formed from a single sheet of material so that the body comprises an integral chordal partition which divides the tubular body into two longitudinally extending tubular spaces disposed in back-to-back relation.

Another object of the invention is providing a tubular body as described above in which the sheet of material is so configured, looped, and spindled that two oppositely disposed edges of the sheet extend longitudinally of the body and so that one of such sheet edges is disposed inside one of the tubular spaces of the body and the other of such sheet edges is disposed outside the body.

Still another object of the invention is providing a longitudinally partitioned tubular body having an integral chordal partition which body is formed of a single sheet of material that is so configured, looped, and spindled that two oppositely disposed edges of the sheet extend longitudinally of the body and so that both such edges of the sheet are disposed outside the body.

Yet another object of the invention is providing a longitudinally partitioned tubular body having an integral chordal partition which body is formed from a single sheet of laminated material comprising a metallic inner lamina and two outer laminae of compatible heat-sealable thermoplastic material so that the body is susceptible to being induction heat sealed and/or being induction heat welded to a head fitment comprising compatible heat-sealable material.

These and other objects of the present invention are achieved by providing a longitudinally partitioned tubular body having a tubular exterior wall and an integral chordal partition which partition has two oppositely disposed longitudinally extending side edges. The body comprises a single sheet of material which material is looped, spindled, and secured to itself along two circumferentially overlapped areas to form two longitudinally extending lap joints or seams. One of the longitudinally extending seams is disposed adjacent each of the two oppositely disposed longitudinally extending side edges of the chordal partition. The integral partition divides the body into two longitudinally extending tubular spaces disposed in back-to-back relation. An embodiment of such a longitudinally partitioned tubular body having an integral chordal partition is provided wherein one of the longitudinally extending edges of the sheet of material from which the body is made is disposed inside one of the tubular spaces and the other longitudinally extending edge of the sheet of material is disposed outside of said body. An alternate embodiment of such longitudinally partitioned body is provided in which both longitudinally extending edges of the sheet of material are disposed outside of said body. Additionally, such longitudinally partitioned tubular bodies may be formed of laminated sheet material comprising a metallic inner lamina and two outer laminae of compatible heat-sealable thermoplastic material so that the seams are susceptible to being heat sealed or welded. Further, such longitudinally partitioned tubular bodies can be formed from a single sheet of material of such dimensions that the sum of the circumferential widths of the circumferentially overlapped areas which form the longitudinally extending seams of the body plus the transverse width of the chordal partition is no greater than one-half the perimeter of said body whereby an end of the body can be collapsed, without pleating the material, to form a transverse end seam consisting of no more than three layers of the sheet of material.

BRIEF DESCRIPTION OF THE DRAWINGS

While the specification concludes with claims particularly pointing out and distinctly claiming the subject matter regarded as forming the present invention, it is believed the invention will be better understood from the following description taken in connection with the accompanying drawings in which:

FIG. 1 is a perspective view of a longitudinally partitioned tubular body having an integral diametral partition which body is a preferred embodiment of the present invention.

FIG. 2 is an enlarged scale end view of the longitudinally partitioned tubular body shown in FIG. 1 which body is formed from a single sheet of laminated material having one inner lamina and two outer laminae.

FIG. 3 is a side elevational view of a longitudinally divided head fitment which can be sealingly secured to the longitudinally partitioned tubular body shown in FIG. 1 to provide a collapsible, longitudinally partitioned tubular dispensing container.

FIG. 4 is a bottom view of the head fitment of FIG. 3.

FIG. 5 is a perspective view of a container assembly comprising a longitudinally partitioned tubular body as shown in FIG. 1 sealingly secured to a head fitment as shown in FIGS. 3 and 4.

FIGS. 6 and 7 are fragmentary sectional views of the container assembly of FIG. 5 taken along lines 6—6 and 7—7 thereof respectively.

FIG. 8 is a perspective view of a collapsible longitudinally partitioned tubular dispensing container comprising the assembly of FIG. 5 wherein the end of the tubular body disposed opposite from the end to which the head fitment is secured is collapsed and sealed to form an unpleated transverse seam consisting of no more than three layers of the sheet of material from which the body of the container is formed.

FIG. 9 is a cross-sectional view of the transverse end seam portion of the container shown in FIG. 8 taken along line 9—9 thereof.

FIG. 10 is a cross-sectional view of the transverse end seam portion of the container of FIG. 8 showing it in a partially collapsed state from the circular cylindrical cross-section of FIG. 2.

FIG. 11 is a cross-sectional view of a partially collapsed end of a tubular body as shown in FIG. 1 to form an unpleated, alternate configuration transverse end seam.

FIG. 12 is a perspective view of a two-compartment, tetrahedral-shape package comprising a tubular body as shown in FIG. 1 having one end collapsed and transversely seamed as shown in FIGS. 9 and 10 and the other end transversely seamed after collapsing it in the manner shown in FIG. 11.

FIG. 13 is a perspective view of a two-compartment package comprising a tubular body as shown in FIG. 1 having both ends collapsed and transversely seamed so that the seams are substantially co-planar.

FIG. 14 is an enlarged scale, end view of an alternate embodiment of a longitudinally partitioned tubular body having an integral diametral partition wherein neither longitudinally extending edge of the sheet of material from which the body is formed is disposed inside the tubular body.

DESCRIPTION OF THE PREFERRED EMBODIMENT

Figure 15:
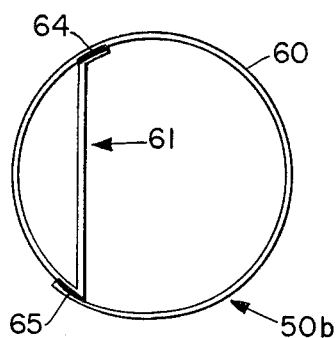
FIGS. 15, 16 and 17 are end views of alternate embodiments of longitudinally partitioned tubular bodies having asymmetrically disposed chordal partitions.

Tubular body 50, FIG. 1, is a preferred embodiment of the present invention. Body 50 is a one-piece article of manufacture comprising a tubular exterior wall 60, and an integral diametral partition 61. Body 50 is formed from a single sheet of material so that there are two longitudinally extending edges 62, 63, two circumferentially overlapped, longitudinally extending lap joints or seams 64, 65, a first or top end 66, and a second or bottom end 67. Diametral partition 61 has longitudinally extending side edges 68, 69, top edge portion 70, and bottom edge portion 71 (not visible in FIG. 1).

Briefly, as shown in enlarged scale in FIG. 2, body 50 comprises a single rectangular-shape sheet of material which has been looped and spindled to integrally form tubular wall 60, diametral partition 61, and circumferentially overlapped longitudinally extending seam-forming areas of the sheet of material disposed adjacent each of the side edges 68, 69 of partition 61. The circumferentially extending overlapped areas are heat sealed or welded to form longitudinally extending lap joints or seams 64, 65. Chordal partition 61 divides the space within tubular body 50 into two longitudinally extending spaces 73, 74.

Referring still to FIG. 2, body 50 is shown to comprise laminated material having two outer laminae 75, 76 and one inner lamina 77. The relative thicknesses of the laminae with respect to the diameter of the body 50 are exaggerated in the figures for clarity. In the preferred embodiment of body 50, seams 64, 65 are heat sealed or welded as by induction heating. Therefore, laminae 75, 76 are of compatible heat sealable material because seam 65 is formed between circumferentially overlapping portions of outer laminae 75 and 76 although seam 64 is formed between circumferentially overlapping portions of lamina 76 only. Were outer laminae 75, 76 not of compatible heat sealable materials, seam 64 could be heat sealed but seam 65 could not be heat sealed without adhesives or the like.

Laminated sheet material wherein laminae 75, 76 are nominally three to four mill polyethylene and lamina 77 is nominally two mill alumina foil is suitable for making bodies 50 for collapsible tubular containers for such products as two component toothpastes because of the cumulative barrier properties of such material, because of the dead fold property of such material, and because such material can be seamed and sealed by induction heat. As used above, dead fold is the property of a material which prevents or operates to reduce the tendency of a folded or rolled-up article to unfold or unroll respectively. Thus, collapsible tubular containers such as toothpaste tubes comprising good dead fold body forming material will not unroll substantially after being rolled up to dispense their contents.

Bodies 50 having diameters of from about 1¼ inches to about 1 5/16 inches and having lengths of about 6 inches have been made from rectangular-shape sheets of the laminated material described above. The sheets are about 6 inches long and about 5 11/16 inches wide. Each of the seams 64, 65 of such bodies have circumferentially extending widths W, FIG. 2, of from about one-eighth inch to about one-fourth inch.

A use for longitudinally partitioned tubular body 50 is illustrated in FIGS. 5 and 8. FIG. 5 shows a container assembly 83 comprising a tubular body 50 having its top end 66 sealingly secured to a longitudinally divided heat fitment which head fitment is shown in FIGS. 3 through 6. The head fitment 85 is sealingly secured to end 66 of body 50 along circumferentially extending seam 86 and diametral seam 96, FIG. 6. FIG. 8 shows a longitudinally partitioned collapsible tubular dispensing container 84 formed from the container assembly 83 of FIG. 5 by collapsing and sealing the bottom end 67 of body 50 to form transverse end seam 87.

Collapsible container assemblies 83, FIG. 5, and containers 84, FIG. 8, are fully described in the simultaneously filed, copending application of Charles R. Hood and Stephen F. Evans entitled COLLAPSIBLE LONGITUDINALLY PARTITIONED TUBULAR DISPENSING CONTAINER. Briefly, however, referring to FIGS. 6, 7, a cylindrical skirt portion 88 of head fitment 85 is telescoped into and sealed to the inside surface of tubular exterior wall 60 of end 66 of tubular body 50. Also, the top edge portion 70 of partition 61, FIG. 6, is fitted and sealed into a downwardly facing diametral channel 89 of head fitment 85. Such an assembly may then be capped and filled through bottom end 67, and then have the bottom end 67 collapsed and sealed as shown in FIG. 8. Alternatively, bottom end 67 can be sealed along seam 87 to form container 84 as shown in FIG. 8 which container 84 can be filled through passageways 93, 94, FIGS. 5, 6, extending longitudinally through head fitment 85.

Still referring to the use of tubular body 50, FIG. 1, to make containers 84, FIG. 8, FIG. 10 shows an intermediate stage or state of collapsing bottom end 67 of tubular body 50 to form transverse end seam 87. As shown in FIGS. 8, 9, seam 87 consists of no more than three unpleated layers of material from which tubular body 50 is formed. FIG. 9 indicates an apparent void 100 in seam 87. However, upon heat sealing seam 87, the void 100 is in fact sealed by the flow of adjacent thermoplastic material from laminae 75, 76. FIG. 11 illustrates an intermediate stage of an alternate way of collapsing an end of tubular body 50 to form an alternate end seal configuration which also provides a three layer, unpleated end seal structure except in the areas of the longitudinally extending joints or seams 64, 65.

FIG. 14 is an end view of an alternate embodiment tubular body 50a embodying the present invention wherein the sheet of body forming material is so configured, looped and spindled that its two longitudinally extending edges 62, 63 are both disposed outside of tubular body 50a. This embodiment of the present invention enables packages and containers comprising such tubular bodies to be filled with materials which might react with the material comprising the inner lamina 77 because in this configuration, upon seaming its end edges, no portion of the inner lamina 77 is exposed to the longitudinally extending spaces 73, 74 within tubular body 50a.

Whereas prior art provides means for sealing internal raw edges of laminated material from materials which may be packed within containers comprising such laminated material, the present invention provides means for obviating the need for sealing raw edges. This is accomplished by body 50, FIG. 1, which has neither edge 62 nor edge 63 within space 74 and by body 50a, FIG. 14, which has neither edge 62 nor edge 63 within space 73 or space 74. Representative examples of sealed-edge prior art include U.S. Pat. No. 2,261,416, issued Nov. 4, 1941 to Mr. Harold D. Schrier, U.S. Pat. No. 2,278,502, issued Apr. 7, 1942 to Mr. Harry F. Waters, U.S. Pat. No. 3,307,738, issued March 7, 1967 to Mr. Christian Theodore Scheindel, and U.S. Pat. No. 3,727,022 issued Apr. 10, 1973 to Mr. Peter W. Hamilton.

Uses of bodies 50, 50a other than as components of collapsible tubular containers are illustrated in FIGS. 12 and 13 in which both ends 66, 67 of tubular body 50 are collapsed and sealed to form packages comprising two longitudinally extending interior spaces. Package 105, FIG. 12, is formed by collapsing and seaming one end 66 of tubular body 50 as shown in FIGS. 9 and 10 and by collapsing and sealing the other end 67 in the manner indicated in FIG. 11. Package 106, FIG. 13, is formed by collapsing and seaming both ends 66, 67 of body 50 in the manner indicated in FIGS. 9 and 10 or, alternatively, both in the manner indicated in FIG. 11 so that the seams are substantially co-planar.

Figure 17:
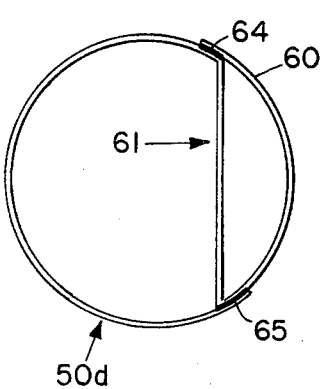
Figure 16:
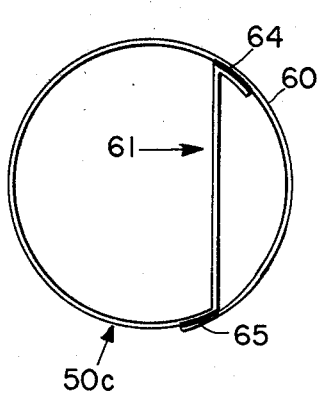
Figure 18:
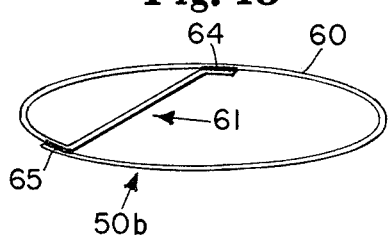
FIGS. 18 and 19 are views of the alternate tubular body configuration of FIG. 15 showing an end thereof in a partially collapsed state and in a fully collapsed, unpleated state respectively.
Figure 20:
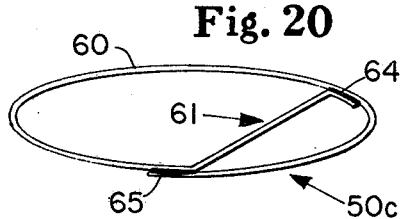
FIGS. 20 and 21 are views of the alternate tubular body configuration of FIG. 16 showing an end thereof in a partially collapsed state and a fully collapsed, unpleated state respectively.
Figure 22:
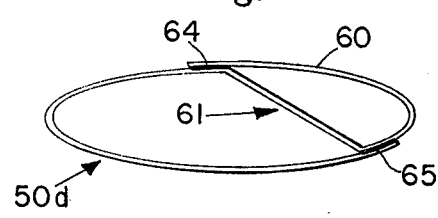
FIGS. 22 and 23 are views of the alternate tubular body configuration of FIG. 17 showing an end thereof in a partially collapsed state and in a fully collapsed, unpleated state respectively.
Figure 23:
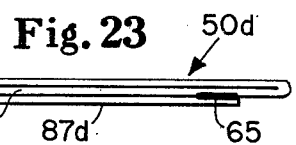
Figure 19:
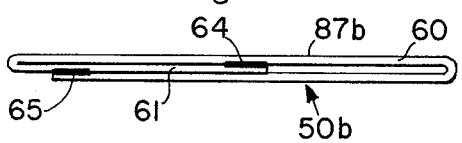
Figure 21:
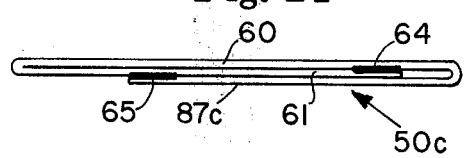

End views of alternate embodiment tubular bodies 50b, 50c, and 50d are shown in FIGS. 15, 16 and 17 respectively. Tubular bodies 50b, 50c and 50d have an asymmetrically disposed integral, chordal partition 61. Body 50b, FIG. 15, has no longitudinally extending edge of the sheet of material from which the tubular body is formed disposed within space 73 which is the smaller longitudinally extending tubular space within it. Body 50c, FIG. 16, has no longitudinally extending edge of the sheet of material from which it is formed disposed within space 73 which is the larger of the two longitudinally extending tubular spaces within it. Body 50d, FIG. 17, has neither longitudinally extending edge 62 nor 63 of the sheet of material from which it is formed disposed within either longitudinally extending space 73, 74 within it. Through the use of these alternate embodiment tubular bodies, longitudinally extending edges 62, 63 can be selectively isolated from either or both components of two-component products packaged within them.

Figure 24:
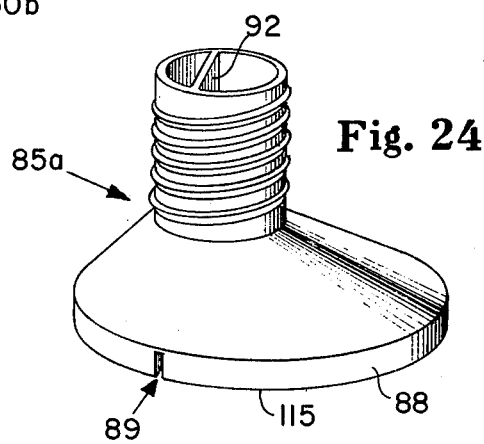
FIG. 24 is a perspective view of an asymmetrical, longitudinally divided head fitment which is compatible with the alternate tubular body configurations of FIGS. 15, 16 and 17.

FIG. 24 is a perspective view of an asymmetrical, longitudinally divided head fitment 85*a* which can be sealingly secured to asymmetrical tubular bodies such as bodies 50*b*, 50*c* and 50*d* illustrated in FIGS. 15 through 17 respectively. FIGS. 18 through 23 illustrate how ends of tubular bodies 50*b*, 50*c*, and 50*d* can be collapsed and sealed to form unpleated, three-layer end seams consisting of no more than three layers of the sheets of material from which the bodies are formed. Collapsible tubes or containers having three layer end seams are, of course, easier to fold-up or roll-up than if they were collapsed in such a manner that the material became pleated or otherwise resulted in having more than three layers of body forming material in the end seam.

While particular embodiments of the present invention have been illustrated and described, it will be obvious to those skilled in the art that various changes and modifications can be made without departing from the spirit and scope of the invention and it is intended to cover in the appended claims all such changes and modifications that are within the scope of this invention.

What is claimed is:

1. A longitudinally partitioned, two compartment, tetrahedral-shape package comprising a tubular body of flexible material, said body having a longitudinally extending twisted chordal partition wall disposed within a tubular wall, the ends of said body being sealed along two transverse seams, said seams comprising oppositely disposed unpleated band-shape end portions of said tubular wall which are oppositely folded flat with respect to adjacent unpleated and unfolded chordal end-edge portions of said partition wall.

2. The longitudinally partitioned tetrahedral-shape package of claim 1 wherein said tubular body is a unitary structure comprising a single sheet of said flexible material, and said partition wall has two oppositely disposed longitudinally extending side edges, said material being looped to form a tube having a theta-shape transverse cross-section and being secured to itself along two circumferentially overlapped areas forming two longitudinally extending joints, one of said joints being adjacent each of said two side edges of said partition wall.

3. The longitudinally partitioned tetrahedral-shape package of claim 2 wherein the sum of the circumferentially extending widths of said overlapped areas of said joints plus the transverse width of said partition wall is no greater than one-half the perimeter of said tubular wall whereby one folded end of said body forms a transverse end seam consisting of no more than three layers of said sheet material.

* * * * *